United States Patent [19]

Morita et al.

[11] Patent Number: 5,019,747
[45] Date of Patent: May 28, 1991

[54] ILLUMINATION CONTROL APPARATUS

[75] Inventors: Masayuki Morita; Kyoji Yamazaki, both of Yokohama, Japan

[73] Assignee: Toshiba Lighting & Technology Corporation, Tokyo, Japan

[21] Appl. No.: 499,010

[22] Filed: Mar. 26, 1990

[30] Foreign Application Priority Data

Mar. 29, 1989 [JP] Japan .................................. 1-77066

[51] Int. Cl.5 ............................................ H05B 37/02
[52] U.S. Cl. .................... 315/157; 315/158; 315/159; 315/360; 315/362; 250/214 AL
[58] Field of Search ............... 315/157, 158, 159, 360, 315/129, 291, 244, 292, 293, 299, 308; 250/214 AL

[56] References Cited

U.S. PATENT DOCUMENTS

| | | | |
|---|---|---|---|
| 4,151,515 | 4/1979 | Pease et al. | 315/293 |
| 4,237,377 | 12/1980 | Sansum | 250/214 R |
| 4,362,970 | 12/1982 | Grady | 315/159 |
| 4,500,814 | 2/1985 | Blake | 315/323 |
| 4,593,234 | 6/1986 | Yang | 315/360 |
| 4,856,011 | 8/1989 | Shimada et al. | 315/149 |
| 4,937,443 | 6/1990 | Smoot | 250/214 AL |
| 4,937,702 | 6/1990 | Kurihara | 315/360 |
| 4,973,835 | 11/1990 | Kurosu et al. | 315/158 |

FOREIGN PATENT DOCUMENTS 62-276608 12/1987 Japan .

Primary Examiner—Eugene R. LaRoche
Assistant Examiner—Son Dinh
Attorney, Agent, or Firm—Cushman, Darby & Cushman

[57] ABSTRACT

An illumination control apparatus includes a control slave unit, a master unit, a supervisory slave unit, and a photosensor slave unit. The supervisory slave unit has an operation switch, and outputs a first signal representing an operation change of the operation switch and the supervisory slave unit. The photosensor slave unit outputs a second signal representing a change of a level of an illuminance detected by a photosensor and the photosensor slave unit. The control slave unit controls at least one illumination load. In addition, the master unit controls the control slave unit assigned in a memory in response to the first signal from the supervisory slave unit and the second signal from the photosensor slave unit. When the master unit receives the first signal representing the supervisory slave unit, the illumination load is inverted. When the master unit receives the second signal representing the photosensor slave unit, and the illuminance is higher than a preset level, the illumination load is turned off. Only when the illuminance is lower than the preset level and the operation switch of the supervisory slave unit is ON, the illumination load is turned on.

16 Claims, 9 Drawing Sheets

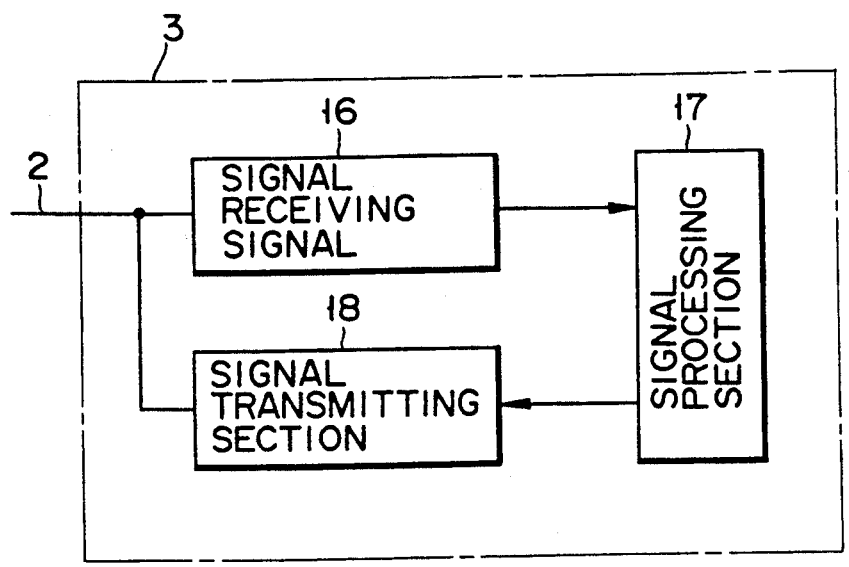
F I G. 3
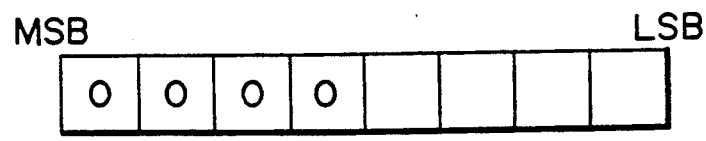
F I G. 7
F I G. 8

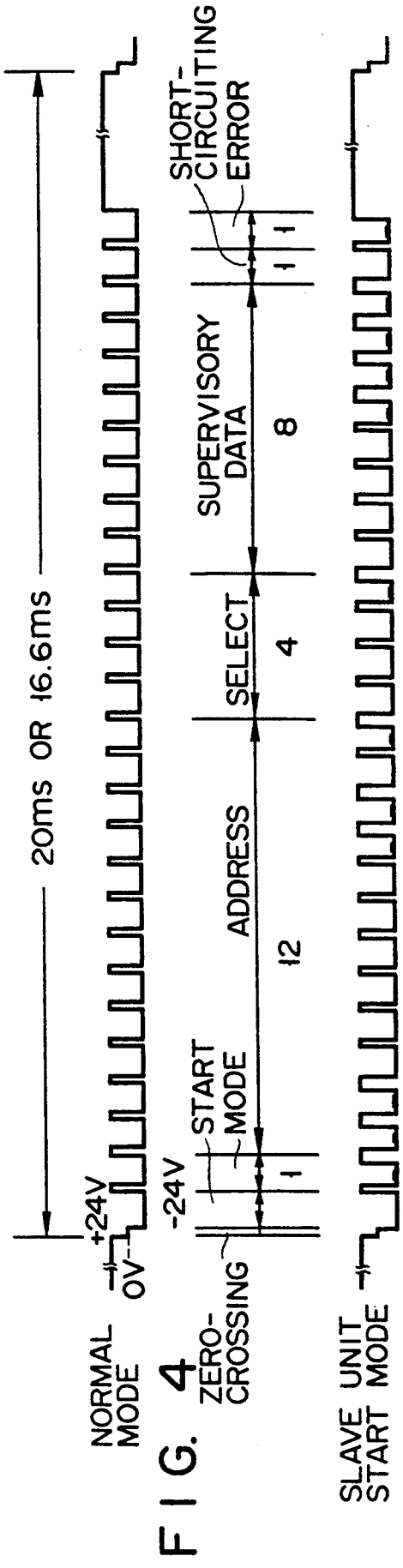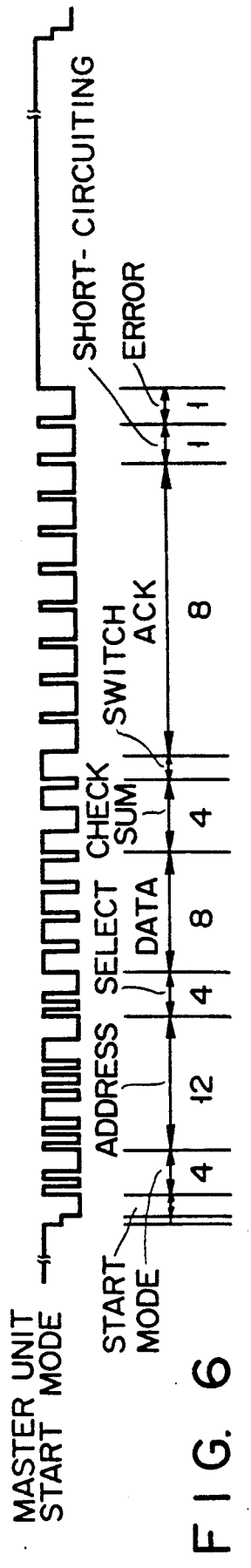

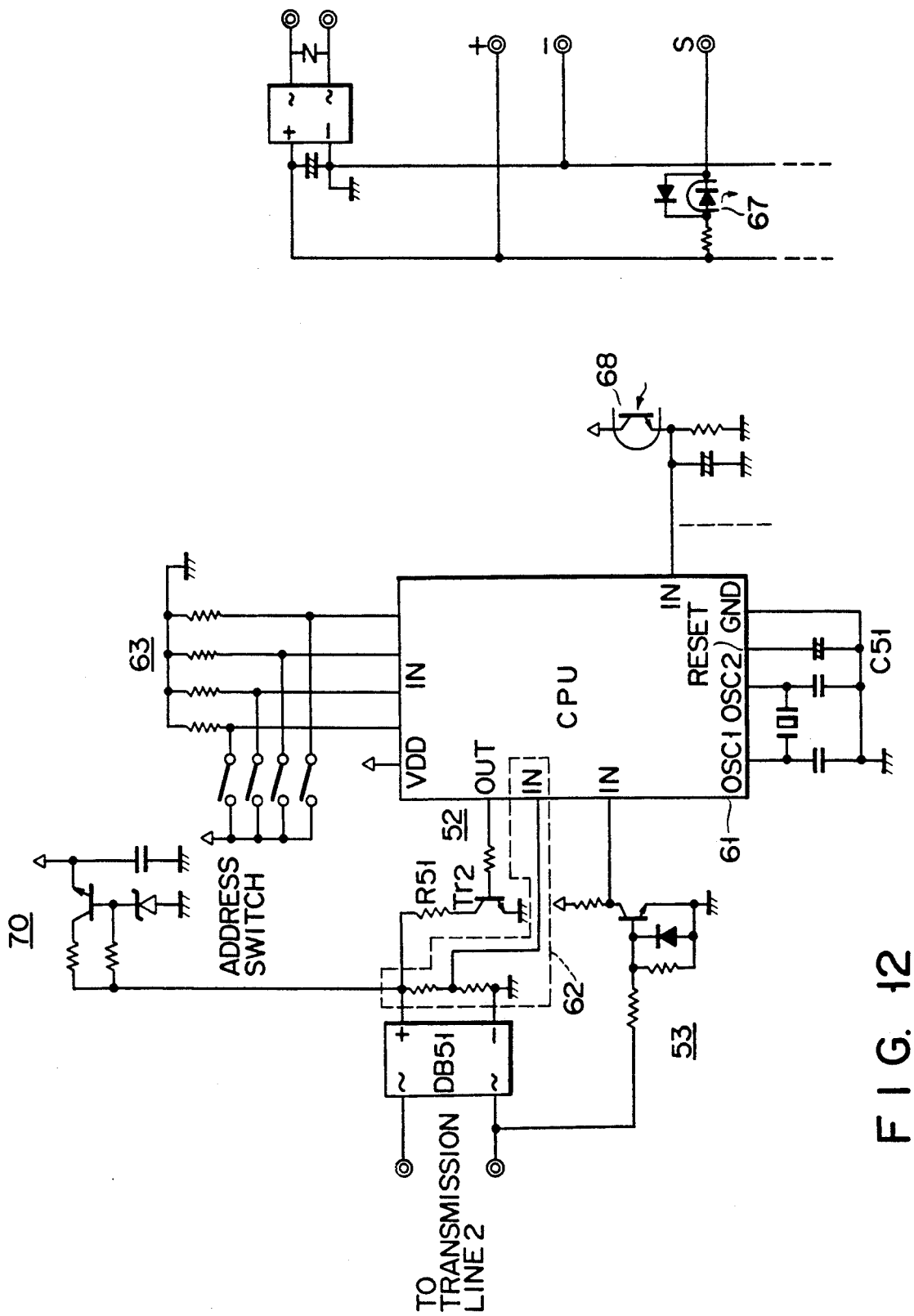
F I G. 12

ILLUMINATION CONTROL APPARATUS

BACKGROUND OF THE INVENTION

1. Field of the Invention

The present invention relates to an illumination control apparatus and, more particularly, to an illumination control apparatus for controlling an illumination load in response to signal outputs from a supervisory slave unit and a photosensor slave unit.

2. Description of the Related Art

A conventional illumination control apparatus is disclosed in, for example, Published Unexamined Japanese Patent Application No. 62-276608, and consists of a supervisory terminal for monitoring the ON/OFF state of an operation switch and a control terminal for ON/OFF-controlling an illumination load, these two devices being connected to a central processing unit through signal lines. This conventional control apparatus additionally comprises a timer terminal which includes a monitor section for monitoring the control state of the illumination load, a comparison and determination section for determining whether the state of the illumination load controlled in response to a timer control signal is the same as the present control state of the illumination load, and a response transmitting section for returning an inversion request signal only when the states are different from each other as a result of comparison and determination.

In such a control apparatus, it is determined whether a control state of the illumination load is the same as the present control state of the illumination load in response to a timer control signal at a predetermined time when the illumination load is to be controlled. If the control states are different from each other, the illumination load is inversion-controlled. Even if the illumination load is set in a state different from a programmed state by the operation switch, a program operation set in a timer is performed with high reliability.

When illumination is artificially controlled in accordance with a program set in a timer, however, a person's will is included in the control operation. In contrast to this, when an illuminance of natural light is detected by, e.g., a photosensor, a person's will is not included. When a photosensor is used in place of a timer, therefore, an illumination unit is unnecessarily turned on in accordance with an exclusive OR relationship between the photosensor and the operation switch.

SUMMARY OF THE INVENTION

It is therefore an object of the present invention to provide an illumination control apparatus which can turn on an illumination load only when necessary.

In order to achieve the above object, according to the present invention, there is provided an illumination control apparatus comprising:

a supervisory slave unit, connected to a transmission line and having an operation switch and a signal generating section for outputting a signal to the transmission line, the signal generating section outputting a first signal representing an operation change of the operation switch every time it is operated and the supervisory slave unit;

a photosensor slave unit, connected to the transmission line and having a photosensor and a signal generating section for generating a signal corresponding to a light amount received by the photosensor, for outputting a second signal representing a change of a level of an illuminance output by a comparison between a present illuminance level and an illumination value detected by a photosensor and the photosensor slave unit;

a control slave unit for controlling at least one illumination load; and a master unit, which is connected to the control slave unit through the transmission line, and has a memory in which the control slave unit corresponding to the supervisory slave unit and photosensor slave unit is assigned, for controlling the control slave unit assigned in the memory in response to the first signal from the supervisory slave unit and the second signal from the photosensor slave unit to output a control signal to the assigned control slave unit through the transmission line for inverting an illumination state of the illumination load when the first signal representing the supervisory slave unit is input to the master unit, to output a control signal to the assigned control slave unit through the transmission line for turning off the illumination load when the second signal representing the photosensor slave unit is input to the master unit and an illuminance level change signal expressing that the illuminance level is higher than a preset level is received from the photosensor slave unit through the transmission line, and to output a control signal to the assigned control slave unit through the transmission line for turning on the illumination load only when an illuminance level charge signal expressing that the illuminance level is lower than the preset level is received through the transmission line and the operation switch of the supervisory slave unit is ON.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a block diagram of a control terminal equipment (control slave unit) shown in FIG. 1;

FIG. 4 is a waveform chart showing a waveform of a signal output from the central processing unit shown in FIG. 1 in a normal mode;

FIG. 5 is a waveform chart showing a waveform of a signal output from each slave unit in a slave unit start mode;

FIG. 6 is a waveform chart showing a waveform of a signal output from the central processing unit in a master unit start mode;

FIG. 7 is a diagram for explaining the contents of supervisory data output from a supervisory slave unit;

FIG. 8 is a diagram for explaining the contents of supervisory data output from a photosensor slave unit;

FIG. 12 is a circuit diagram showing a detailed arrangement of the photosensor slave unit;

DETAILED DESCRIPTION OF THE PREFERRED EMBODIMENTS

An illumination control apparatus according to an embodiment of the present invention will be described hereinafter, with reference to the accompanying drawings.

Figure 1:
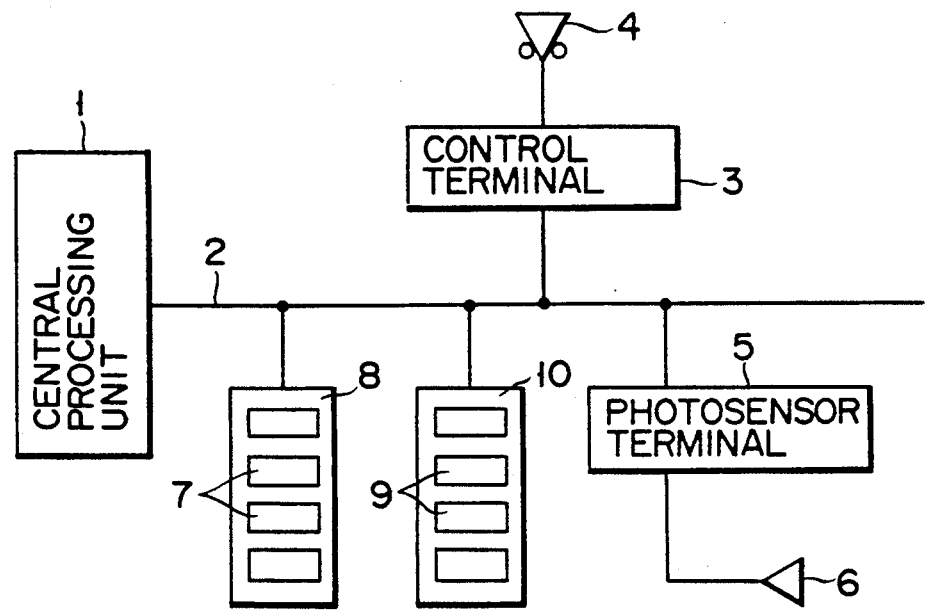
FIG. 1 is a block diagram showing an illumination control apparatus according to an embodiment of the present invention.

Referring to FIG. 1, reference numeral 1 denotes a central processing unit including a memory serving as a master unit. A control terminal 3 including a plurality of control slave units is connected to the CPU 1 through a two-wire transmission line 2 serving as a signal line. One or a plurality of illumination loads 4, such as an incandescent lamp(s) or a fluorescent lamp(s) are connected to the control terminal 3.

Similarly, a photosensor terminal 5 serving as a photosensor slave unit, connected to a photosensor 6 for detecting the illuminance of natural light, is connected to the CPU 1 through the two-wire transmission line 2. The terminal 5 outputs a high-level signal when the illuminance is detected to be equal to or higher than a predetermined value, and a low-level signal when it is below the predetermined value.

Also connected to CPU 1, through the two-wire transmission line 2, are an individual switch terminal 8, serving as a supervisory slave unit having individual operation switches 7 each for ON/OFF-controlling the illumination load 4, and a group switch terminal 10, serving as a supervisory slave unit having group switches 9 serving as pattern switches for ON/OFF-controlling the plurality of illumination loads 4 in units of groups assigned to the memory in the CPU 1.

Figure 2:
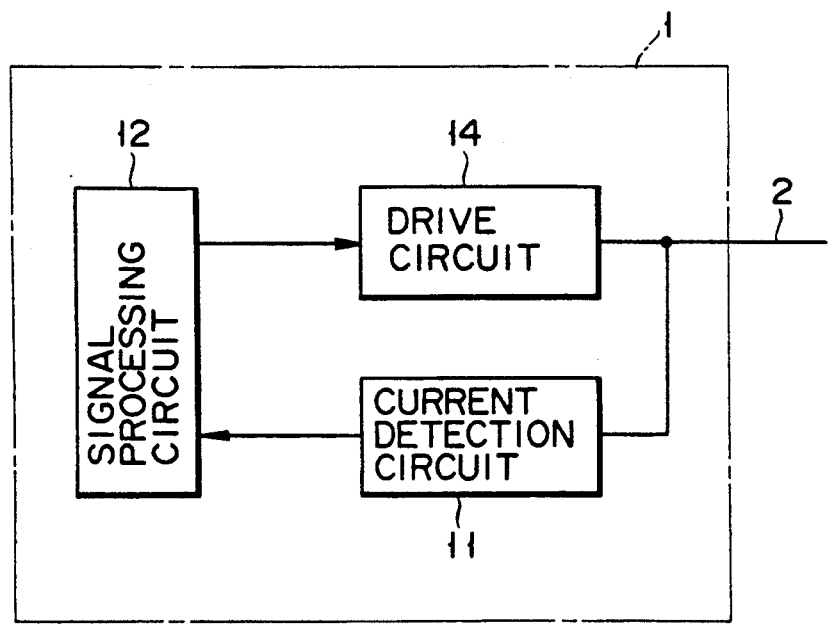
FIG. 2 is a block diagram of a central processing unit (master unit) shown in FIG. 1.

As shown in FIG. 2, the CPU 1 includes a signal processing circuit 12, a drive circuit 14, and a current detection circuit 11. A change in current, represented by response signals transmitted from the control terminal 3, the photosensor terminal 5, the individual switch terminal 8, and the group switch terminal 10 through the two-wire transmission line 2, is detected by the current detection circuit 11, and the signals from these terminals are processed by the signal processing circuit 12. More specifically, circuit 12 produces transmission signals to be sent to the above-mentioned slave units are produced in the signal processing circuit 12, and drive circuit 14 outputs a bipolar pulse of, for example, ±24 V, as shown in FIG. 6. In addition, the current detection circuit 11 detects a current serving as a response signal from the terminals 3, 5, 8, and 10, and outputs a signal to the signal processing circuit 12, which in turn outputs a control signal for inverting the polarity of a pulse output from the drive circuit 14.

The control terminal 3 includes a signal receiving section 16, a signal transmitting section 18, and a signal processing section 17. The signal receiving section 16 receives signals transmitted from the CPU 1, the photosensor terminal 5, the individual switch terminal 8, and the group switch terminal 10 through the two-wire transmission line 2. The signal receiving section 16 is connected to the signal processing section 17, which itself is connected to the two-wire transmission line 2 through the signal transmitting section 18 for transmitting a signal in a current mode. Also connected to the signal processing section 17 are the illumination loads 4—connected to the control terminal 3, the photosensor 6—connected to the photosensor terminal 5, the operation switches 7 in the individual switch terminal 8, and the group switches 9 in the group switch terminal 10.

A supervisory signal output from the individual switch terminal 8, the group switch terminal 10, or the photosensor terminal 5 which serves as a supervisory terminal will be described hereinafter, with reference to FIGS. 4 and 5.

As shown in FIG. 4, the CPU 1 outputs a start signal after a zero-crossing signal is output in a stand-by state as a normal mode. The unit 1 outputs a sync pulse to inform a transmission timing to the photosensor terminal 5, the individual switch terminal 8, and the group switch terminal 10 during a 27-bit (consisting of a 1-bit mode signal, a 12-bit address signal, a 4-bit select signal, 8-bit supervisory data, and a 1-bit short-circuiting signal, and a 1-bit error signal) slave unit transmitting time interval. The zero-crossing signal corresponds to one cycle of a power source, i.e., the zero-crossing signal is output for each 20 ms when one cycle corresponds to 50 Hz, and is output for each 16.7 ms when one cycle corresponds to 60 Hz. Assume that the photosensor terminal 5, the individual switch terminal 8, and the group switch terminal 10 are started in a slave unit start mode. As shown in FIG. 5, if the slave units are started after the zero-crossing and start signals are output, the CPU 1 receives the 1-bit mode signal and then the 12-bit self-address signal. The first two bits, for example, of the self-address signal include an identification code such as "00" (when the individual switch terminal 8 is started), "01" (when the group switch terminal 10 is started) or "10" (when the photosensor terminal 5 is started) to identify whether the individual switch terminal 8, the group switch terminal 10, or the photosensor terminal 5 is started. In addition, after the CPU 1 receives the 4-bit select signal, the CPU 1 receives the 8-bit supervisory data signal. This supervisory data signal serves as an enable signal representing that the individual switches 7 are operated when the individual switch terminal 8 is started, and serves as an enable signal representing that the group switches 9 are operated when the group switch terminal 10 is started. When the photosensor terminal 5 is started, the supervisory signal denotes the level of the illuminance detected by the photosensor 6, i.e., bright or dark, and the presence/absence of a change.

Note that the supervisory data signal has a format shown in FIGS. 7 and 8. In 8-bit supervisory data from the individual switch terminal 8 or the group switch terminal 10, upper four bits are "0", and the lower four bits represent the switch numbers of the operation switches 7 or 9 of the individual switch terminal 8 or the group switch terminal 10. The lower four bits sequentially represent switch No. 4, No. 3, No. 2, and No. 1. When one of the bits is set at logic "1", it indicates that the switch with the corresponding number is turned on, i.e., enabled. In addition, as shown in FIG. 8, in 8-bit supervisory data from the photosensor terminal 5, upper four bits represent sensor levels, and lower four bits represent sensor numbers. The upper four bits sequentially represent, from the MSB, the sensor No. 4 level, the sensor No. 3 level, the sensor No. 2 level, and the sensor No. 1 level, in the order named. Similarly, the lower four bits sequentially represent, from the upper bit, the sensor No. 4, the sensor No. 3, the sensor No. 2, and the sensor No. 1, in the order named. In the bits which correspond to the sensor levels, "1" represents a dark level, and "0" represents a bright level. In the bits which correspond to the sensors, "1" represents a change in state.

The CPU 1, which outputs a signal shown in FIG. 5 when it receives a signal from the supervisory slave unit, further outputs a signal shown in FIG. 6 to the control terminal 3 in a master unit start mode. More specifically, the CPU 1 is set in an in-phase state at a zero-crossing. Thereafter, the master unit is started, and a 4-bit mode signal, a 12-bit address signal of a transmitting destination, a 4-bit select signal, an 8-bit control data signal, and a 4-bit check sum signal are sequentially output. In addition, after a transmitting/receiving switching time interval elapses, the CPU 1 sequentially receives an 8-bit response signal from the control terminal 3 which is a transmitting destination, a 1-bit return flag, and a 1-bit signal representing the presence/absence of an error by an error flag.

Figure 9:
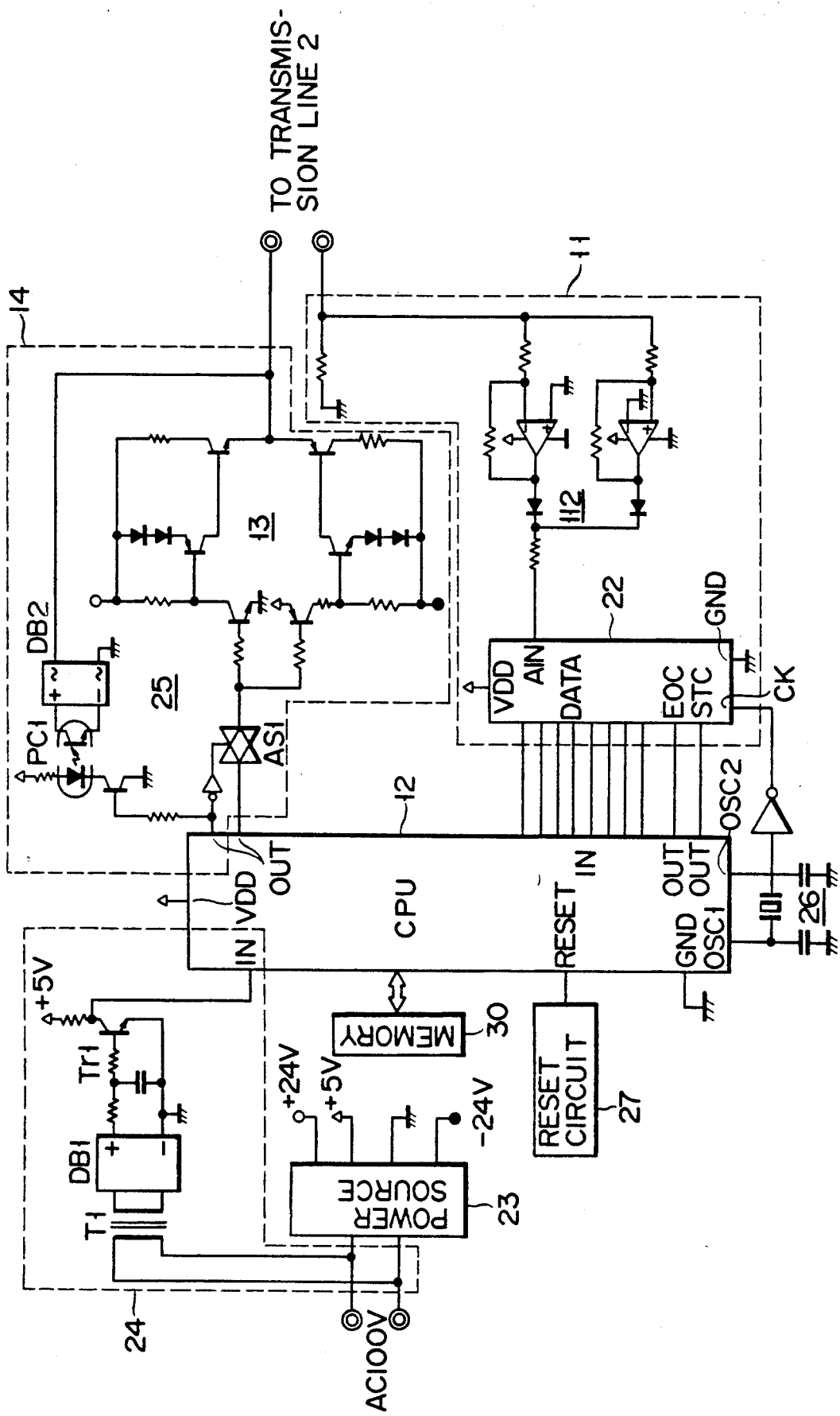
FIG. 9 is a circuit diagram showing a detailed arrangement of the master unit shown in FIG. 1.

FIG. 9 is a circuit diagram showing a detailed arrangement of the CPU 1 shown in FIG. 1. Referring to FIG. 9, the CPU 1 includes the current detection circuit 11, the signal processing circuit (CPU) 12, the drive circuit 14, a DC power source 23, and a zero-crossing detection circuit 24 for detecting the zero-crossing signal from the AC power source. The DC power source 23 causes the AC power source to generate a voltage of ±24 V used in, e.g., an output stage of the drive circuit 14, and a DC voltage of +5 V used in the circuits other than the output stage. The current detection circuit 11 includes a detection circuit 112 for detecting and amplifying a return pulse representing a current change from the above-mentioned slave units, and an A/D converter 22 for converting an analog output from the current detection circuit 112 into digital data which can be processed by the signal processing circuit 12. The drive circuit 14 includes a zero-crossing signal transmitting circuit 25 for transmitting a zero-crossing signal to the transmission line 2, and a bipolar pulse generation circuit 13. The CPU 1 further includes an oscillation circuit 26 for oscillating a drive clock used in the signal processing circuit 12, and a reset circuit 27 for setting the signal processing circuit 12 in an initial state. In addition, the signal processing circuit 12 includes a memory 30 to which the control slave unit 3 corresponding to the supervisory slave unit 8, 10 and photosensor slave unit 5 is assigned through a bus.

A case wherein a transmission signal is supplied to the above-mentioned terminals from the CPU 1 will be described hereinafter. First, the signal processing circuit 12 supplies a voltage signal, which is set to be 0 V at "0" level and 5 V at "1" level, to the bipolar pulse generation circuit 13, which then supplies to the transmission line 2 a bipolar pulse signal (FIG. 6) in a voltage mode set to be −24 V at "0" level and +24 V at "1" level.

The zero-crossing detection circuit 24 detects a zero-crossing signal from the AC power source, and inputs the zero-crossing signal set at "1" level to the signal processing circuit 12. In this detection circuit 24, for example, AC power of 100 V is supplied from the AC power source to a diode bridge DB1 through an insulating transformer T1. In addition, when a full-wave rectified output from the bridge DB1 is applied to the base of a transistor Tr1, and is ultra-C class amplified, a zero-crossing signal having a voltage of 5 V is output to the collector of the transistor Tr1 when the full-wave rectified output is 0 V, i.e., at the timing of a zero-crossing of the AC power source.

The signal processing circuit 12 supplies this zero-crossing signal to the zero-crossing signal transmitting circuit 25, if required; for example, when the CPU is started. When the zero-crossing signal is input, an analog switch AS1 is turned off. Therefore, supply of a voltage signal from the signal processing circuit 12 to the bipolar pulse generation circuit 13 is interrupted, and hence signal transmission from the CPU to each terminal equipment is interrupted. At this time, a photocoupler PC1 is driven in response to the zero-crossing signal from the signal processing circuit 12, and the AC terminals of a diode bridge DB2 are short-circuited, thereby short-circuiting the wires of the transmission lines 2. Therefore, a zero-crossing signal having a voltage level of "0" V is transmitted to each terminal.

Although the above-mentioned zero-crossing signal is conventionally generated by all of the terminals, in this embodiment, however, it is generated in the CPU and transmitted to each terminal, this being more advantageous, since only one zero-crossing detection circuit required, as opposed to the case wherein a detection circuit must be provided for each terminal. Thus, in this embodiment, a simple, low-cost circuit arrangement can be realized.

Figure 10:
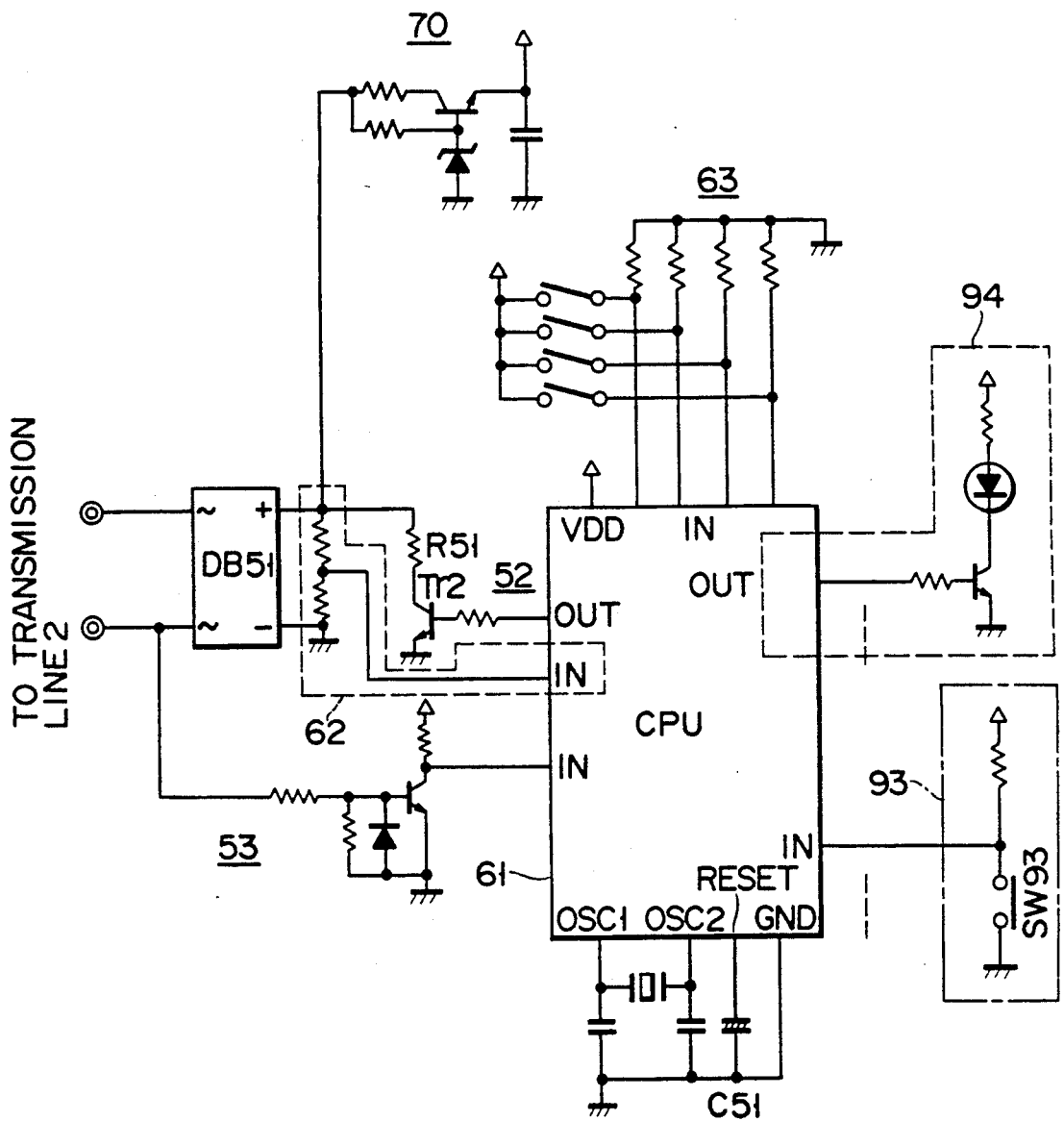
FIG. 10 is a circuit diagram showing a detailed arrangement of the supervisory slave unit shown in FIG. 1.

FIG. 10 is a circuit diagram showing a detailed arrangement of the supervisory slave units 8 and 10.

Referring to FIG. 10, reference numeral 61 denotes a microprocessor (CPU); and 52 and 53, signal transmitting and receiving circuits, respectively.

Reference numeral 62 denotes a zero-crossing signal receiving circuit; 63, a self-address setting circuit; and 65, a clock generation circuit. Reference numeral C51 denotes a capacitor for resetting the CPU 61 when the terminal is turned on; and DB 51, a diode bridge for matching the transmission line 2 of a bipolar (AC) system with the transmitting circuit 52 and the zero-crossing signal receiving circuit 62 of a unipolar (DC) system.

The receiving circuit 53 generates a signal of 0 V when the voltage mode of the transmission line 2 is set at "0", and a signal of 5 V when the voltage mode of the line 2 is set at "1", the signal generated being supplied to the CPU 61. The CPU 61 generates a transmitting signal (pulse) which is received by the transmitting circuit 52. When this transmitting signal is set at "1", a transistor Tr2 is turned on, and a resistor R51 is connected between the wires of the transmission line 2. At this time, the resistor R51 serves as a current sink, and a current (corresponding to the pulse width) supplied to the resistor R51 changes a current which flows through the transmission line. This change is detected by the current detection circuit 11 (FIG. 2) in the CPU, so that a signal in a current mode is transmitted from each terminal to the CPU.

The interwire voltage of the transmission line 2 is set to be 0 when a zero-crossing signal is output from the CPU 1, and +24 V or −24 V when no zero-crossing signal is output. The zero-crossing signal receiving circuit 62 serves as a voltage-dividing resistor circuit for dividing a DC terminal voltage of the diode bridge DB51 into about 1/5 thereof. A power source circuit 70 is connected to this voltage-dividing resistor circuit. When a output from the zero-crossing signal receiving circuit 62 is lowered to 0 V from about 5 V, the CPU 61 detects the output as a zero-crossing signal. This zero-crossing signal is generated when a lighting control terminal for an incandescent lamp is used, in which case the lighting control terminal is driven by current phase control using a thyristor. And a phase control pulse of 5 V can be generated every half cycle of the AC power source at a phase angle based on this zero-crossing signal and a control signal transmitted from the CPU.

On the other hand, when an operation switch SW93 is turned on in a supervisory load 93, the CPU 61 detects this, and generates supervisory data representing the ON/OFF state of the switch SW93. This supervisory data is supplied to the CPU in a current mode. More specifically, an address data set manually by the address switches 63 and the supervisory data is supplied to the master unit (CPU 1) as a current. It should be noted that when no data is supplied from the operation switch SW93, the CPU 61 is disabled, and if data is supplied, a signal representing that a slave unit is started is output. At this time, the address data manually set by the address switches 63 and the supervisory data is supplied to the master unit (CPU 1) as a current.

Reference numeral 94 denotes an LED for indicating the ON/OFF state of the load. The LED is turned on upon receiving a master start mode signal.

Figure 11:
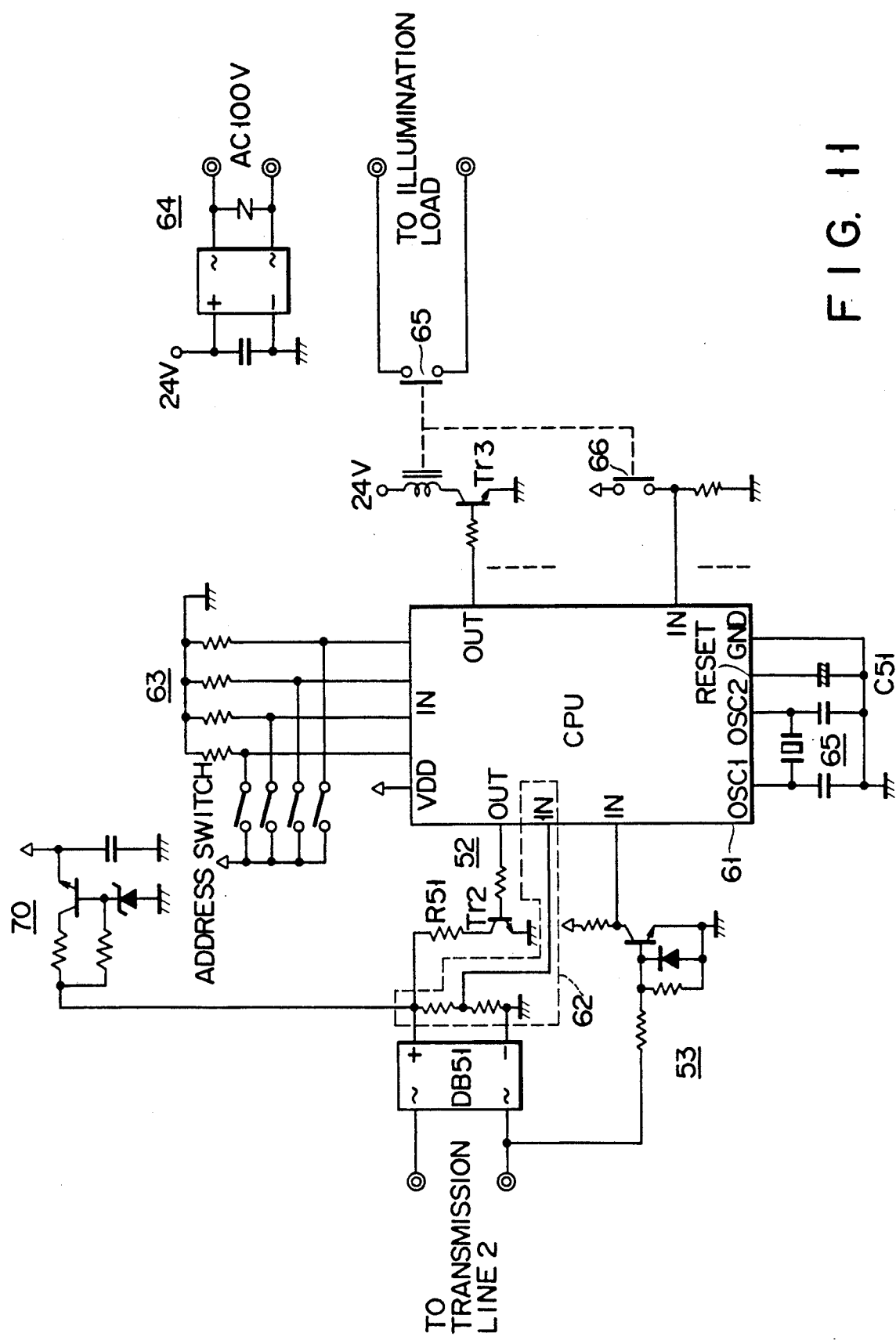
FIG. 11 is a circuit diagram showing a detailed arrangement of the control slave unit.

FIG. 11 shows a detailed circuit arrangement of the control terminal equipment 3.

Referring to FIG. 11, the CPU 61 receives control data from the CPU 1, to output a pulse of 5 V. At this time, a transistor Tr 3 is turned on, as is a contact 65, thereby illuminating the illumination load. In addition, a contact 66 is turned on, and a response signal is supplied to the CPU 1, through the CPU 61, to confirm that the illumination load is in the ON state. Reference numeral 64 denotes a power source circuit for supplying power to the above-mentioned relay. The operations performed by the other circuits in FIG. 1 are the same as those of the circuits in FIG. 10.

Figure 13:
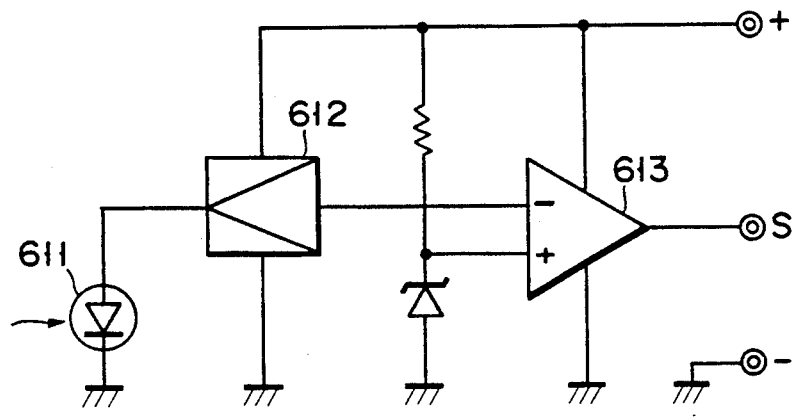
FIG. 13 is a circuit diagram showing a detailed arrangement of a photosensor.

FIG. 13 is a circuit diagram showing a detailed arrangement of the photosensor 6.

External light is detected by a photocell 611, and is converted into a current corresponding to the intensity thereof. This current is amplified by an amplifier 612 and supplied to a comparator 613. The comparator 613 compares the supplied current with a reference value to output a predetermined photosensor signal to an S terminal. This photosensor signal is supplied to the photosensor terminal. A detailed circuit arrangement of the photosensor terminal is shown in FIG. 12. More specifically, the photosensor signal is supplied to a photocoupler PC2 consisting of light-emitting and light-receiving elements 67 and 68, and is detected. Therefore, a high-level signal is supplied to the CPU 61. Reference numeral 70 denotes a power source circuit for the photocoupler 68. Operations of the other circuits are the same as those of the circuits shown in FIG. 10.

Figure 14:
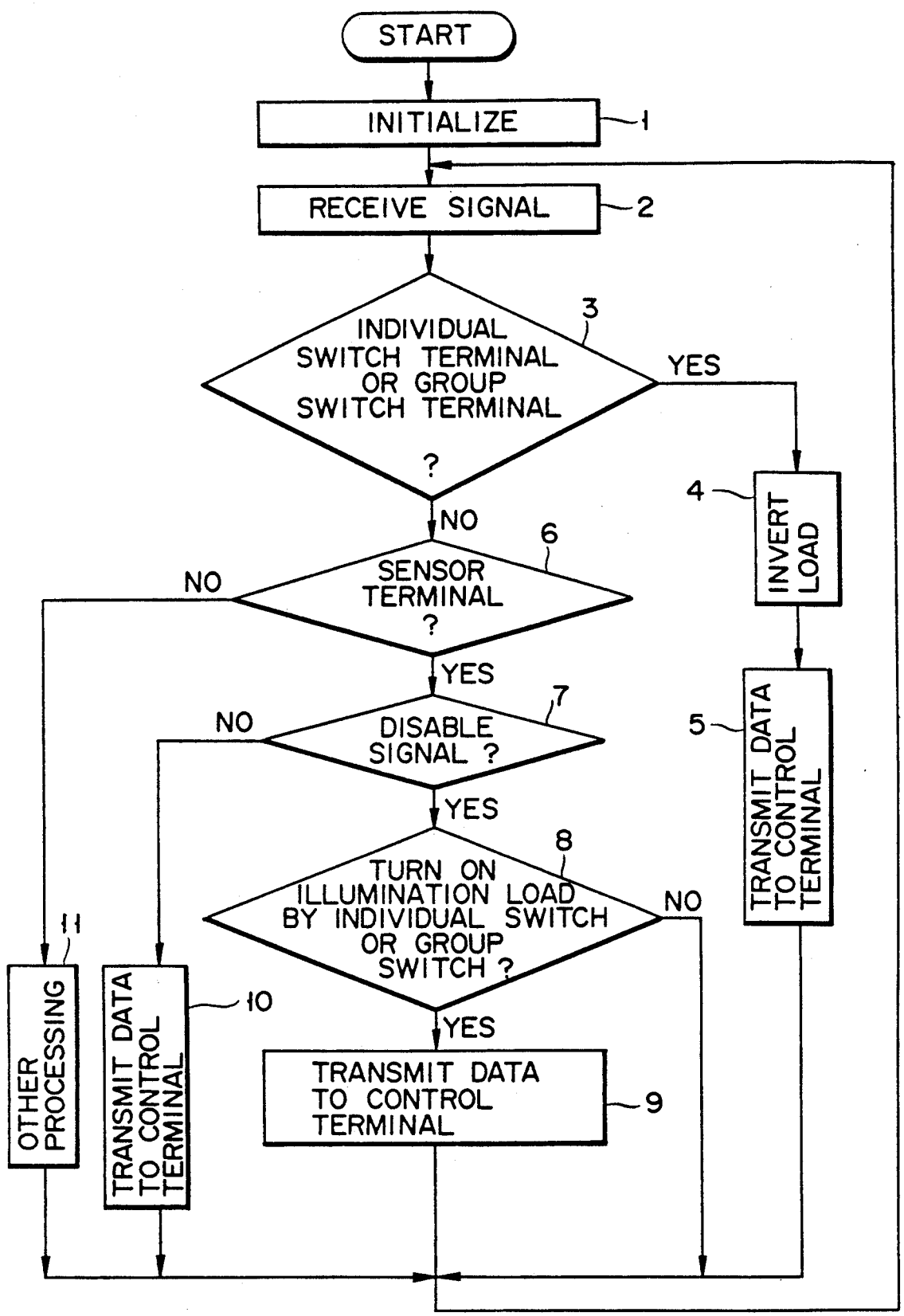
FIG. 14 is a flow chart for explaining an operation of the master unit shown in FIG. 1.

An operation of the CPU 1 will be described hereinafter with reference to a flow chart in FIG. 14.

First, the CPU 1 is initialized (step 1). For example, the CPU 1 receives a signal shown in FIG. 5 from the individual switch terminal 8 or the group switch terminal 10 (step 2). It is detected whether the individual switch terminal 8 or the group switch terminal 10, or another terminal is started on the basis of a self-address signal (step 3). If it is detected that the individual switch terminal 8 or the group switch terminal 10 is started, a control state of the illumination load 4 is inverted. For example, a signal to switch from an ON state to an OFF state or from an OFF state to an ON state is produced (step 4), and control data to invert the control state of the illumination load 4 is supplied to the control terminal 3 (step 5). Thereafter, the flow returns to step 2. If it is determined in step 3 that neither the individual switch terminal 8 nor the group switch terminal 10 are started, it is determined whether the photosensor terminal 5 is started (step 6). If it is determined that the photosensor terminal 5 is started, it is determined whether a disable signal is output, i.e., whether the illuminance of the illumination load is decreased below a predetermined illuminance (step 7). If the disable signal is output, it is further determined whether the illumination load is turned on by an individual switch 7 or a group switch 9 (step 8). If neither switches are operated, the flow returns to step 2. If a signal representing that the illumination load is to be turned on by an individual switch 7 or a group switch 9 is transmitted, data to turn on the illumination load is transmitted to the control terminal 3 (step 9), and the flow returns to step 2.

In addition, if it is determined in step 7 that the disable signal is not output, i.e., that the illuminance of the illumination load is equal to or higher than the predetermined illuminance, data to turn off the illumination load 4 is transmitted to the control terminal 3 (step 10), and the flow returns to step 2.

Furthermore, if it is determined in step 6 that the photosensor terminal 5 is not started, other processing is performed (step 11), and the flow returns to step 2.

Figure 15:
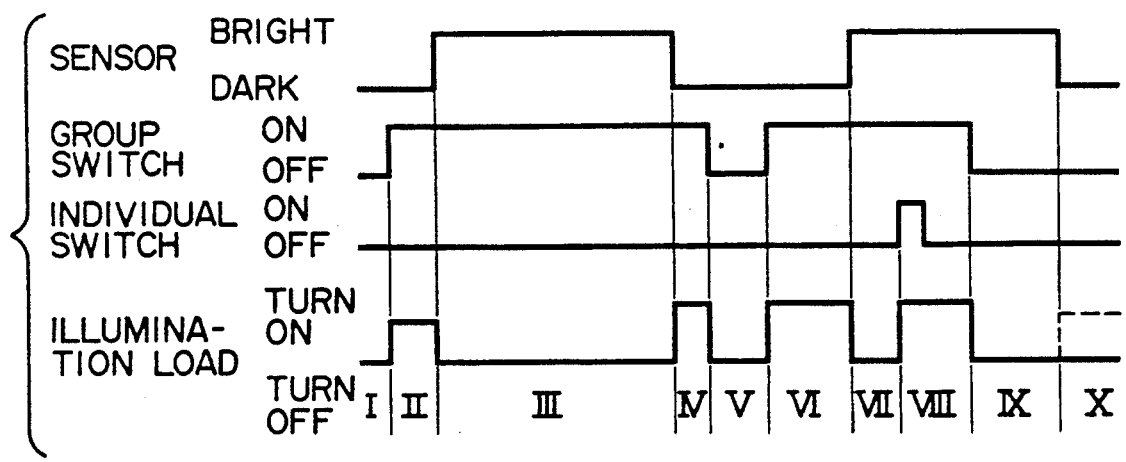
FIG. 15 is a timing chart showing an operation of an illumination load shown in FIG. 1.

An ON/OFF operation of the illumination load 4 will be described hereinafter with reference to a timing chart in FIG. 15.

The photosensor 6 detects that the illuminance of the photosensor terminal 5 is below the predetermined illuminance, and the group switch terminal 10 outputs a signal representing that the group switches 9 are OFF. While the individual switch terminal 8 outputs a signal representing that the individual switches 7 are OFF, the illumination load 4 is kept OFF (time interval I). When the group switch terminal 10 outputs a signal representing that a group switch 9 is turned on in this state, the CPU 1 outputs a signal to turn on the illumination load 4 to the control terminal 3, thus turning on the illumination load 4 (time interval II). When the photosensor terminal 5 detects that the illuminance becomes equal to or higher than the predetermined value, the CPU 1 outputs a signal to turn off the illumination load 4 to the control terminal 3, thus turning off the illumination load 4 (time interval III). When the photosensor terminal 5 detects that the illuminance becomes lower than the predetermined value again, the illumination load 4 is turned on (time interval IV). Thus, when the illuminance is lower than the predetermined value, an ON/OFF operation of the illumination load 4 is performed in accordance with an ON/OFF operation of the group switch 9 (time intervals V and VI). When the photosensor terminal 5 outputs a signal representing that the illuminance is equal to or higher than the predetermined value while the group switches 9 are ON, the illumination load 4 is not turned on (time interval VII). At this time, however, when an individual switch 7 is operated and the individual switch terminal 8 outputs a signal representing that the individual switch 7 is turned on, the corresponding illumination load 4 which is kept OFF is inverted and turned on (time interval VII). In this case, when a group switch 9 is turned off, the illumination load 4 is turned off (time interval IX). Note that the illumination load 4 may be turned off by an individual switch 7. In addition, if the illuminance is below the predetermined value, the illumination load 4 is not turned on unless a group switch 9 or an individual switch 7 is operated (time interval X).

According to the above embodiment, an ON/OFF operation of the illumination load 4 is controlled by the photosensor terminal 5 and the individual switch terminal 8, or the group switch terminal 10. Therefore, accidental illumination which occurs when the illuminance is equal to or higher than the predetermined value, or unnecessary illumination which occurs when the illuminance is below the predetermined value can be prevented. Note that the present invention is not limited to ON/OFF control of an illumination load, and can be applied to a dimmer. Also, the signal processing circuits used in the above-described slave units can be fixed on LS1 circuits.

According to the present invention, since the illumination load is controlled in response to a signal output from the supervisory slave unit and the photosensor slave unit, unnecessary illumination of the illumination load can be prevented.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An illumination control apparatus comprising:
a supervisory slave unit, connected to a transmission line and having an operation switch and a signal generating section for outputting a signal to the transmission line, said signal generating section outputting a first signal representing an operation change of said operation switch every time it is operated and said supervisory slave unit;
a photosensor slave unit, connected to the transmission line and having a photosensor and a signal generating section for generating a signal corresponding to a light amount received by said photosensor, for outputting a second signal representing a change of a level of an illuminance output by a comparison between a preset illuminance level and an illumination value detected by the photosensor and said photosensor slave unit;
a control slave unit for controlling at least one illumination load; and
a master unit, which is connected to said control slave unit through the transmission line, and has a memory in which said control slave unit corresponding to said supervisory slave unit and photosensor slave unit is assigned, for controlling said control slave unit assigned in said memory in response to the first signal from said supervisory slave unit and the second signal from said photosensor slave unit to output a control signal to said assigned control slave unit through the transmission line for inverting an illumination state of said illumination load when the first signal representing said supervisory slave unit is input to said master unit, to output a control signal to said assigned control slave unit through the transmission line for turning off said illumination load when the second signal representing said photosensor slave unit is input to said master unit and an illuminance level change signal representing that the illuminance level is higher than a preset level is received from said photosensor slave unit through the transmission line, and to output a control signal to said assigned control slave unit through the transmission line for turning on said illumination load only when an illuminance level change signal representing that the illuminance level is lower than the preset level is received through the transmission line and said operation switch of said supervisory slave unit is ON.

2. An apparatus according to claim 1, wherein said first signal generating section has a means for outputting a signal representing that said operation switch is turned on to the transmission line.

3. An apparatus according to claim 1, wherein said master unit comprises a current detection circuit for detecting a signal representing a change in current from one of said supervisory slave unit and said photosensor slave unit and signal processing means for receiving an output from said current detection circuit and generating a digital signal including a start signal, an address signal, and a control signal for controlling a predetermined control slave unit.

4. An apparatus according to claim 2, wherein said master unit further comprises a zero-crossing detection circuit for detecting a zero-crossing point of an AC power source, and a DC power source for generating a DC voltage of two types from said AC power source.

5. An apparatus according to claim 4, wherein said master unit further comprises an oscillation circuit for generating a drive clock for driving said signal processing means, and a reset circuit for setting said signal processing means in an initial state.

6. An apparatus according to claim 3, wherein said supervisory slave unit comprises an individual switch terminal including at least one individual switch and a group switch terminal including at least one group switch, and the signal from one of said supervisory slave unit and photosensor slave unit includes supervisory data representing whether the individual switch or the group switch is operated, or a level and the presence/absence of a change of the illuminance detected by said photosensor.

7. An apparatus according to claim 3, wherein the signal from one of said supervisory slave unit and photosensor slave unit includes an identification code for identifying whether said supervisory slave unit or said photosensor slave unit is started.

8. An apparatus according to claim 6, wherein the supervisory data includes a plurality of bits of information and the lower four bits represent switch numbers when said individual switch or said group switch is operated.

9. An apparatus according to claim 6, wherein the supervisory data includes a plurality of bits of information and the upper four bits represent a sensor level, and the lower four bits represent sensor numbers when said photosensor slave unit is started.

10. An apparatus according to claim 1, wherein said supervisory slave unit comprises a signal processing section for detecting that a desired switch is turned on and generating supervisory data representing an ON/OFF state of said switch, a transmitting circuit for receiving a transmission signal from said signal generating section and transmitting it as a current change to said master unit, and a receiving circuit for supplying a predetermined signal to said signal processing section in accordance with a voltage level of said transmission line.

11. An apparatus according to claim 10, wherein said transmitting circuit includes resistor and transistor elements, said transistor element being turned on when the transmission signal from said signal processing section is set at logic "1" to connect said resistor element between wires of said transmission line, thereby causing a current change in said transmission line.

12. An apparatus according to claim 10, wherein said supervisory slave unit further comprises a diode bridge circuit for rectifying a signal from said master unit and generating a rectified output, and a zero-crossing signal receiving circuit including a voltage-dividing resistor circuit for dividing a voltage of the rectified output from said diode bridge circuit.

13. An apparatus according to claim 10, wherein said supervisory slave unit further comprises an address switch for manually setting a desired address, and a light-emitting diode (LED) for displaying an ON/OFF state of said illumination load.

14. An apparatus according to claim 1, wherein said control slave unit comprises a receiving circuit for outputting a predetermined signal in accordance with a voltage level of said transmission line, a signal processing section for receiving an output from said receiving circuit and outputting a control signal for controlling an ON/OFF state of said illumination load, means for generating a signal for confirming that said illumination load is kept ON, a circuit for transmitting the confirming signal as a current change to said master unit, a diode bridge circuit for rectifying a signal from said master unit and generating a rectified output, and a zero-crossing signal receiving circuit including a voltage-dividing resistor circuit for dividing a voltage of the rectified output from said diode bridge circuit.

15. An apparatus according to claim 1, wherein said photosensor slave unit comprises a photocoupler for receiving a detection signal from said photosensor to output a predetermined signal, a signal processing section for receiving an output from said photocoupler to generate predetermined supervisory data, a circuit for receiving a transmission signal from said signal processing section and transmitting the signal to said master unit, a diode bridge circuit for rectifying a signal from said master unit and generating a rectified output, and a zero-crossing signal receiving circuit including a voltage-dividing resistor circuit for dividing a voltage of the rectified output from said diode bridge circuit.

16. An apparatus according to claim 1, wherein said photosensor comprises a photocell for detecting external light to convert the light into a current, and a comparator for comparing the current with a reference value.

* * * * *